United States Patent

Colby, Jr.

[11] Patent Number: 4,502,052
[45] Date of Patent: Feb. 26, 1985

[54] PASSIVE DATA ACQUISITION AND ANALYSIS SYSTEM FOR MICROWAVE

[75] Inventor: George V. Colby, Jr., Lexington, Mass.

[73] Assignee: Avco Corporation, Wilmington, Mass.

[21] Appl. No.: 460,458

[22] Filed: Jan. 24, 1983

[51] Int. Cl.³ .............................................. G01S 3/02
[52] U.S. Cl. .................................... 343/458; 343/461
[58] Field of Search ................ 364/458; 343/458, 461, 343/450, 451, 453

[56] References Cited

U.S. PATENT DOCUMENTS

| | | | |
|---|---|---|---|
| 3,134,104 | 5/1964 | Murphree et al. | 343/458 |
| 3,333,270 | 7/1967 | Page | 343/458 |
| 3,476,921 | 11/1969 | Jones et al. | 364/458 |
| 3,577,146 | 5/1971 | Freier | 343/458 |
| 3,604,003 | 9/1971 | Freier | 364/458 |
| 3,798,647 | 3/1974 | Bailey | 343/458 |
| 4,008,470 | 2/1977 | Lanning et al. | 343/458 |
| 4,041,494 | 8/1977 | Ewen et al. | 343/458 |
| 4,177,465 | 12/1979 | Lundvall et al. | 343/458 |
| 4,187,491 | 2/1980 | Lindstrum et al. | 343/458 |

Primary Examiner—Theodore M. Blum
Assistant Examiner—Brian Steinberger
Attorney, Agent, or Firm—Abraham Ogman

[57] ABSTRACT

A passive data determination system (10) for use in a traveling projectile (12) is provided including a logarithmic receiver (20) for receiving a power signal $P_r$ from a source target (14) and emitting in response thereto an output voltage signal $E_o$ which is proportional to the logarithm of $P_r$. A clock pulse signal is provided, such as by an oscillator (22) to measure a change in output voltage $\Delta E_o$. Means such a microprocessor (28) provides a signal R which is a function of $Kv \cdot (\Delta t / \Delta E_o)$, where K is equal to $-2$ (log e) and V is a known relative velocity between the projectile (12) and the target (14) and which indicates the range of the projectile to the target.

8 Claims, 2 Drawing Figures

PASSIVE DATA ACQUISITION AND ANALYSIS SYSTEM FOR MICROWAVE

BACKGROUND OF THE INVENTION

This invention relates to a passive system for microwave data acquisition and analysis for use in a traveling projectile such as a missile, or the like, which is directed at a microware radiating (or other wave energy radiating) target.

Present systems for determining the range of a traveling aircraft or other projectile to a distant target typically utilize a two-way link wherein an emitted signal travels to the target and back again (i.e. radar). The returning signal is compared to a reference signal so that the round trip delay may be measured and converted to range. However, because such active systems themselves emit a signal they are readily susceptible to detection and/or jamming.

This invention recognizes that a passive system, e.g., one which does not itself emit a signal, is preferable to an active system in that no detectable signal is emitted.

Presently such a passive system is utilized in anti-radiation missiles wherein angle to an emitter target is measured. However present passive detection systems do not measure range to the target and such range measurement is often desirable in order to enable optimum firing of the missile or other projectile.

Therefore, it is an object of this invention to provide a passive data acquisition and analysis system for use in a traveling projectile which provides rapid and accurate information regarding the range and time to a radiating target.

It is a further object of this invention to provide such a passive system which avoids detection of its projectile and the jamming such as may be performed upon active, e.g. radiation emitting, systems.

It is a further object of this invention to provide a passive data determination system which has a number of civilian and military applications.

It is a further object of this invention to provide a passive data determination system which may measure and compare radiating power from a number of target sources.

It is a further object of this invention to provide a passive data determination system which is able to detect radiation undergoing a much smaller energy loss than is undergone in active systems.

It is a further object to provide a passive data determination system which is relatively simple to construct and readily incorporated into existing active sensor systems.

SUMMARY OF THE INVENTION

The present invention results from a realization that power received by a projectile in flight from a radiating target equals:

$$Pr = \frac{A_r G_s P_s}{4\pi R^2}$$

where,
$A_r$ = Effective area of the receiving antenna
$R$ = Range
$G_s$ = Gain of the source antenna
$P_s$ = Power transmitted by the source A logarathmic receiver may respond to such a received power to emit a voltage signal $E_o$ which is proportional to log $P_r$ and therefore is proportional to:

$$\log \frac{A_r}{4\pi} + \log G_s P_s - 2 \log R$$

The first two terms are essentially constant and the final term, $-2 \log R$, varies according to range. Therefore $E_o$ varies according to range, e.g. $E_o \sim -2 \log R$.

Monitoring the change in $E_o$ ($\Delta E_o$) over time ($\Delta t$) provides:

$$\frac{\Delta E_o}{\Delta \tau} \sim \frac{-2 \Delta}{\Delta \tau} (\log R)$$

which in turn equals:

$$-2 (\log e) \frac{1}{R} \frac{(\Delta R)}{(\Delta \tau)}$$

$(\Delta R/\Delta \tau)$ = relative velocity V between the projectile and the target and $-2(\log e)$ is a constant (k). Therefore, $$\frac{\Delta E_o}{\Delta \tau} = Kv/R$$

Therefore, if at any point in the flight path of a projectile the relative velocity V is known, R may be calculated simply by measuring $\Delta E_o/\Delta \tau$.

Further, the above equation readily translates into:

$$R = \frac{Kv}{\Delta E_o} \cdot \Delta t$$

Therefore, R can be directly found by measuring the time $\Delta t$ required to produce a given $\Delta E_o$ from the receiver.

Thus the invention therefore features a passive data acquisition and analysis system for use in a traveling projectile including means defining a logarithmic receiver for receiving a power signal $P_r$ from a target and emitting an output voltage signal $E_o$ which is proportional to the logarithm of $P_r$. There are means for providing a clock pulse signal to measure a change im time, $\Delta t$, required to produce a change in output voltage, $\Delta E_o$. Additionally there are means for providing a signal R which is a function of:

$$(KV/\Delta E_o) \cdot \Delta \tau$$

Where K is a known constant $-2(\log e)$, and V is a known relative velocity between the projectile and the target, which indicates the range of the projectile to the target.

In a preferred embodiment the means for providing signal R may also provide a signal t which is a function of $$K \frac{\Delta t}{\Delta E_o}.$$

The means for providing signal R may be a microprocessor, typically comprising 1–3 integrated circuits.

The means for providing clock pulse signals may include an oscillator. A distinct local oscillator comprising a Gunn Diode or transistor may also be included for reducing the frequency of signal $P_r$ prior to reception thereof by the logarithmic receiver.

The logarithmic receiver may comprise a receiver mixer such as diode quad and a logarithmic amplifier which includes, typically, seven integrated circuits or seven transistors.

An A/D circuit may be provided for converting the voltage output signal and clock pulse signal to digital signals for use in the means for providing signal R. Means such as a sample/hold circuit may be provided for delaying delivery of a voltage output to the means for providing signal R until a previous R signal has been provided thereby.

Calibration means may be provided including means for generating a test signal which is a function of the measured $P_r/(\Delta E_o)$ ratio comparing the test signal with a desired $Pr/\Delta Eo$ and compensating the log receiver to provide the desired $Pr/\Delta Eo$ ratio.

Other objects, features and advantages of the invention will be apparent from the following detailed description of preferred embodiments with reference therein to the accompanying drawing in which:

DETAILED DESCRIPTION OF PREFERRED EMBODIMENTS

Figure 1:
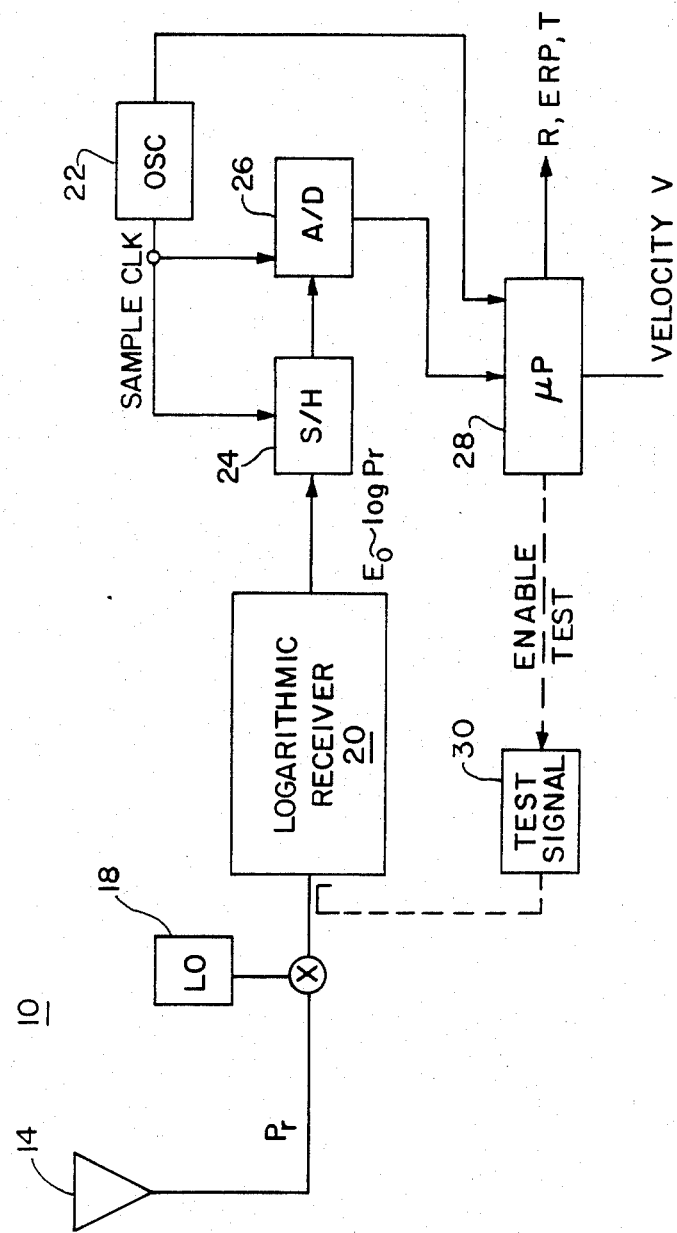
FIG. 1 is a schematic view of the passive data determination system of this invention.
Figure 2:
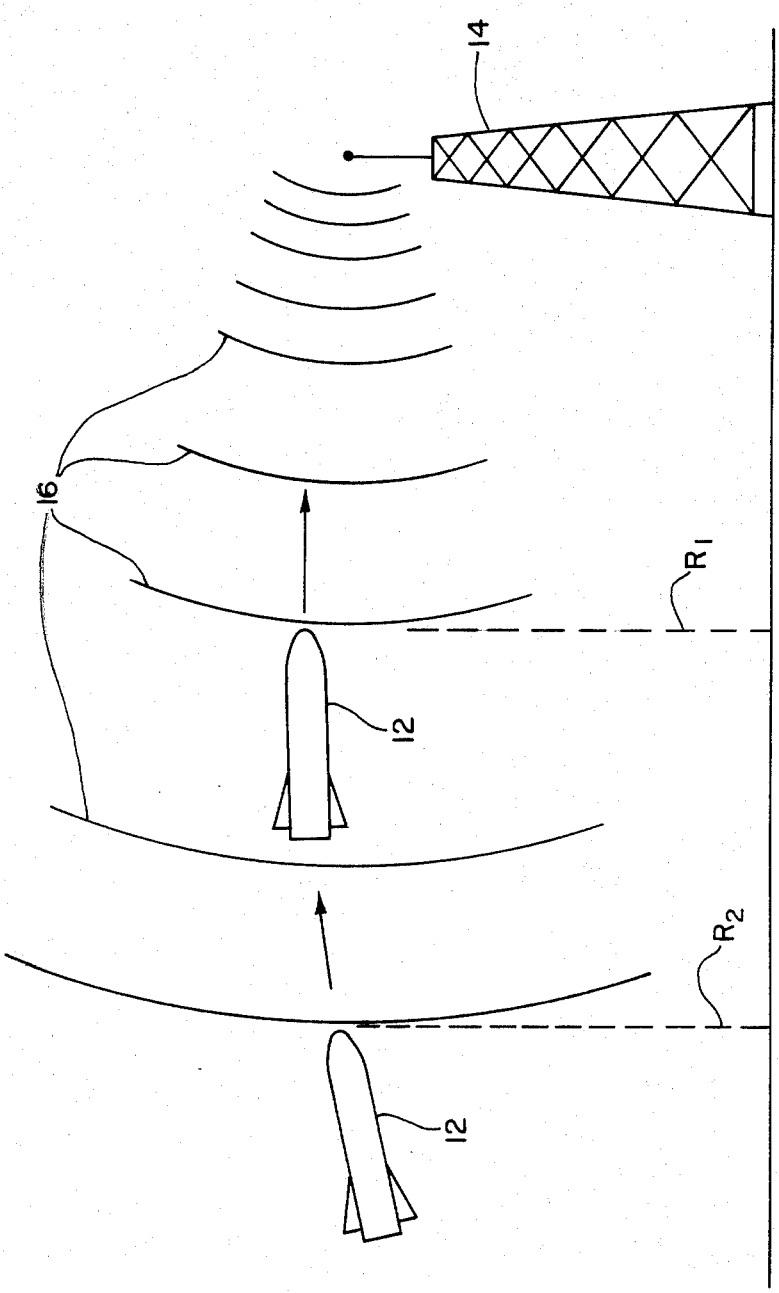
FIG. 2 is a simplified, diagrammatic view of a projectile using the system of this invention for determining range and time to a radiating target.

There is shown in FIG. 1 a passive data determination system 10 according to this invention which may be used in a projectile 12, FIG. 2, for determining range and time to a radiating target 14.

At each point in its flight path projectile 12 encounters radiation, 16. The power signal $P_r$ of the encountered radiation 16 varies according to the distance R (e.g. range) of projectile 12 from target 14: Signal $P_r$ decreases by a factor of $R^2$ as the radiation travels away from target source 14. Therefore the power signal $P_r$ of radiation 16 sensed by projectile 12 at range $R_1$ is smaller than that sensed by projectile 12 at range $R_2$.

Referring to FIG. 1, the frequency of signal $P_r$ is reduced by local oscillator 18 and sensed at the reduced frequency by log receiver 20. In response thereto receiver 20 emits a voltage signal $E_o$ which is proportional to the log of the received power $P_r$.

An oscillator 22 provides clock pulse signals t in a conventional manner to a sample/hold circuit (S/H) 24, an A/D circuit 26, and a microprocessor 28.

Each signal $E_o$ provided by receiver 20 is transmitted through S/H circuit 24 and is converted to a digital pulse by A/D circuit 26. This digital signal is then provided to microprocessor 28. A/D converter 26 also converts each clock pulse signal t to a digital signal for delivery to microprocessor 28. The relative velocity V, between projectile 12 and target 14, which is known, is also provided to microprocessor 28.

As the projectile 12 approaches the target 14, e.g. advances from $R_2$ to $R_1$, FIG. 2, microprocessor 28 processes the changing $E_o$ and t values provided to it and measures the change in output voltage and the change in time, e.g. $\Delta E_o$, $\Delta t$. As heretofore derived $$\frac{\Delta Eo}{\Delta t} = \frac{KV}{R}$$

and $$R = \frac{KV}{\Delta Eo}(\Delta t)$$

Accordingly, microprocessor 28 solves either of the above equations and provides a signal which indicates the range R to the target 14, e.g. Range $R_1$ in FIG. 2. This signal may be displayed and/or recorded as required by conventional means.

The projected time of arrival of projectile 12 at target 14 may also be calculated by microprocessor 28 as follows: At range $R_1$ a known velocity $V_1$ yields a range estimate:

$$R_1 = \frac{KV\Delta t}{\Delta Eo}.$$

Inasmuch as projectile 12 should reach target 14 at a time:
$t_1 = R_1/V$, then:
$t_1$ equals $$K\frac{(\Delta t)}{\Delta Eo}$$

K is a known value and $\Delta t$ and $\Delta E_o$ are measured by microprocessor 28 as described above. Accordingly $t_1$ is readily solved and a signal thereof may be provided and displayed, recorded or stored as necessary.

An additional capability of this invention is determination of the effective radiating power (ERP) of one or more target sources under investigation. As heretofore derived:

$$E_o \sim \log \log \frac{Ar}{4\pi} + \log G_s P_s - 2 \log R.$$

The ERP is equal to $G_s P_s$ where $P_s$ is the source transmitted power and $G_s$ is the gain of the source. Accordingly, when microprocessor 28 has solved for range R, for example $R_1$, FIG. 2. $G_s P_s$ may be readily calculated by the microprocessor simply by measuring $E_o$ at $R_1$. (Note that $(Ar)/(4\pi)$ is a known value). Such information may be particularly useful in differentiating between a number of closely grouped target/power sources and identifying an individual desired target. A sample and hold (S/H) circuit 24 is provided to hold a sample voltage $E_o$. This function is necessary where microprocessor 28 is in the process of performing one of the aforementioned functions and is incapable of accepting an additional $E_o$ input [in digital form]. When microprocessor 28 is free to accept the subsequent $E_o$, circuit 22 releases that signal. Typically such delays do not occur in present rapidly operating microprocessors and in such cases, an S/H circuit may not be required.

A test circuit 30, FIG. 1 may be provided to aid in calibrating receiver 20. Ideally the log receiver 20 should exhibit a characteristic ratio between the difference in received Power $P_r$ and the difference in output voltage $\Delta E_o$ at two distinct points in the flight path: for example, 10 db/volt circuit 30 provides a signal which is a function of the measured $P_r/\Delta E_o$. This signal is compared with the desired $P_r/\Delta E_o$, e.g. 10 dB/volt, and if the tested value is found to have drifted from the desired value, the receiver 20 may be compensated to provide the desired value.

Therefore, the present invention allows for range and time to target determination without emission of an undesirable two way signal from the projectile 12. Detection of the projectile is thus made much more difficult. Jamming is defeated as the jamming signal itself becomes a target source. This invention is particularly useful for and in missile attacks upon radars or other communication sites. Passive ranging to fixed ground sites such as a VOR or radio station is also enabled.

The system may be used as a fuze against a jammer. The projectile is fired at the jammer with velocity preset. System 10 measures range R as heretofore described and generates a fire signal at the appropriate range.

Operation of the passive ranger against sources in which the carrier is present a large percentage of the time is straightforward, provided the transmitted power is essentially constant, which is generally the case. Operation against a source which comes and goes, such as a search radar which may sweep by the sensor from time to time, is also straightforward but requires additional processing so that the change in received signal level with time is sampled at corresponding points on each sweep, for example at the peak. Appropriate processing algorithms can take care of either case.

The present invention provides enhanced tracking over active transmit systems due to the fact that the sensed radiation (one way) is losing energy at a rate of only $R^2$ (R being Range) whereas such energy is lost at a rate of $R^4$ in active two way systems.

The present invention may be utilized in conjunction with an active sensor to cover the contingency that the active sensor is jammed. In such cases the passive system takes over and generates a fire signal.

Because the system of this invention is relatively non-complex it may be readily constructed and incorporated into existing projectiles and data determination systems.

It is evident that those skilled in the art, once given the benefit of the foregoing disclosure, may now make numerous other uses and modifications of, and departures from, the specific embodiments described herein without departing from the inventive concepts. Consequently, the invention is to be construed as embracing each and every novel feature and novel combination of features present in, or possessed by, the apparatus and techniques herein disclosed and limited solely by the spirit and scope of the appended claims.

What is claimed is:

1. A passive data determination system for use in a traveling projectile comprising:

means for providing a signal V representing the relative velocity of said projectile to a target;

means defining a logarithmic receiver for receiving a power signal $P_r$ from a source target and emitting in response thereto an output voltage signal $E_o$ which is proportional to the logarithm of $P_r$;

means for providing a clock pulse signal to measure a change in time, $\Delta t$, required to produce a change in output voltage $\Delta E_o$; and microprocessor means coupled to said logarithmic receiver to produce a signal proportional to $\Delta E_o$, to said clock means to produce a signal proportional to $\Delta t$, and to said velocity means to receive the signal V, all for providing a signal R which is a function of $(KV\Delta t)/(\Delta E_o)$, where K is equal to $-2$ (log e), and where R indicates the range of said projectile to said target.

2. Microprocessor means in accordance with claim 1 wherein said means for providing a signal R further provides a signal t which is a function of K $(\Delta t)/\Delta E_o$.

3. System in accordance with claim 1 wherein said means for providing a signal R includes a microprocessor.

4. System in accordance with claim 1 wherein said means for providing clock pulse signals includes an oscillator.

5. System in accordance with claim 1 further including a local oscillator for reducing frequency of said power signal $P_r$ received by said logarithmic receiver.

6. System in accordance with claim 1 further including means for converting said output voltage signal $E_o$ to a digital signal.

7. System in accordance with claim 1 further including means for delaying delivery of said voltage output signal to said means for providing a signal R until a previous signal R has been generated.

8. System in accordance with claim 1 further including calibration means including means for generating a test signal which is a function of measured $P_r/\Delta E_o$, comparing said test signal with a predetermined $P_r/\Delta E_o$ and compensating said log receiver to provide the predetermined $P_r/\Delta E_o$ ratio.

* * * * *